UNITED STATES PATENT OFFICE.

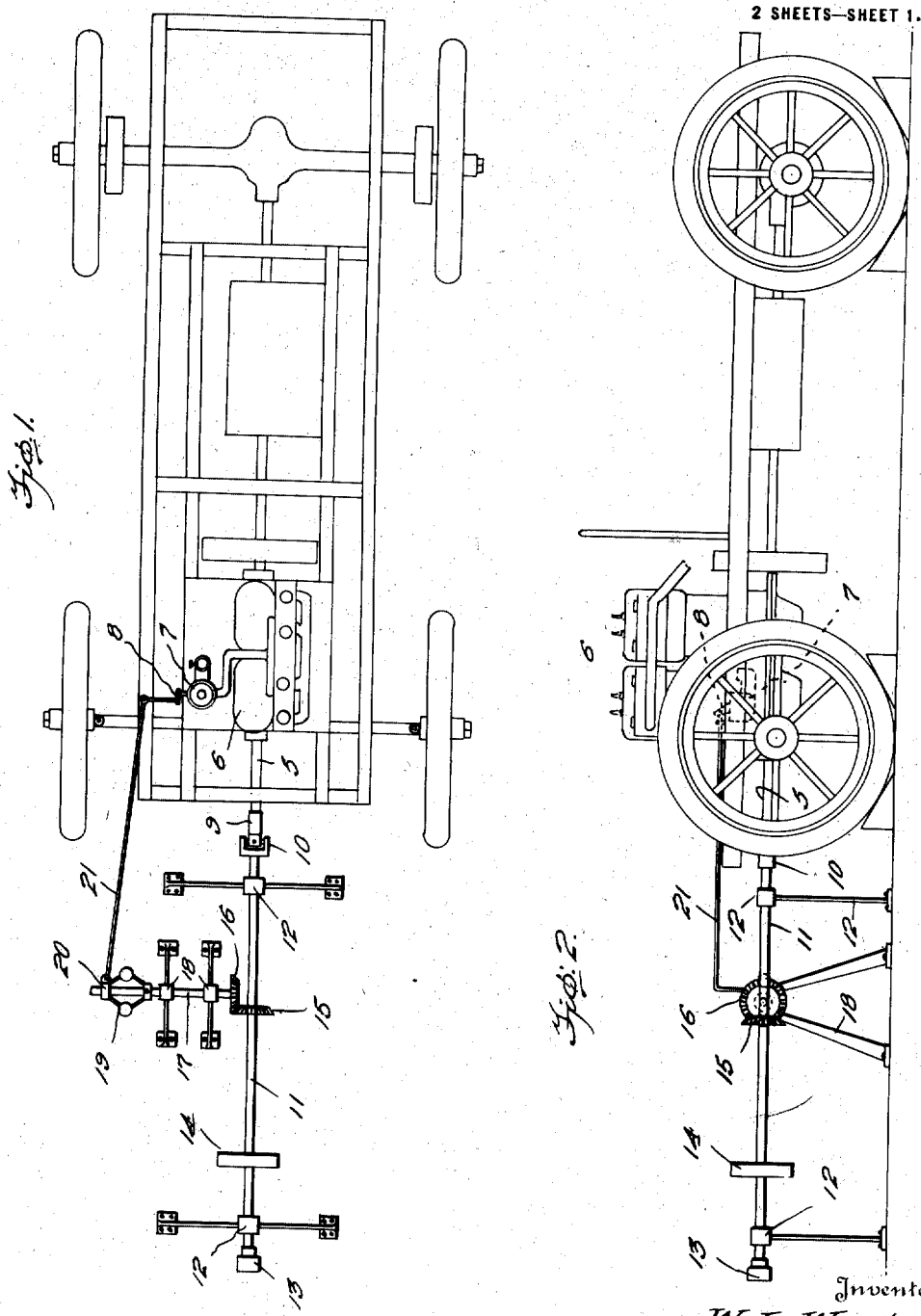

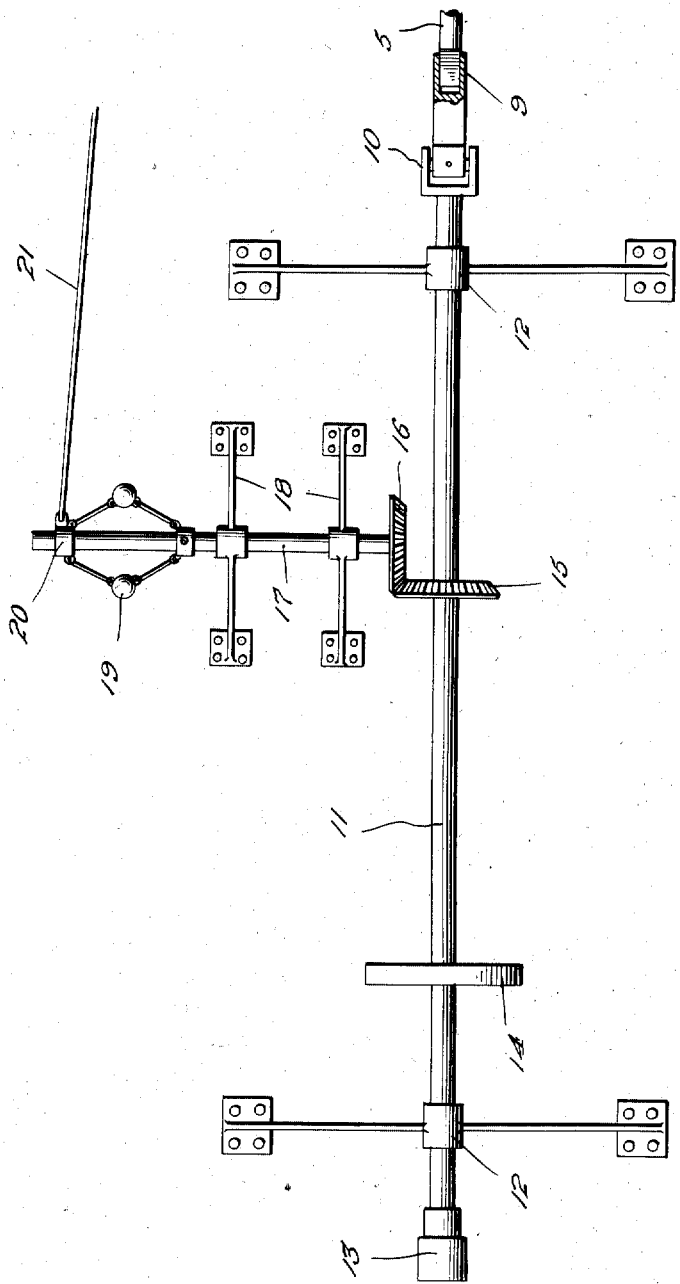

WILLIAM L. WARD, OF SAGUACHE, COLORADO.

POWER-TRANSMISSION MECHANISM.

1,252,209.  Specification of Letters Patent.  Patented Jan. 1, 1918.

Application filed September 5, 1916. Serial No. 118,522.

*To all whom it may concern:*

Be it known that I, WILLIAM L. WARD, a citizen of the United States, residing at Saguache, in the county of Saguache and State of Colorado, have invented certain useful Improvements in Power-Transmission Mechanism, of which the following is a specification, reference being had therein to the accompanying drawing.

This invention relates to improvements in power transmission mechanism, one object of the invention being the provision of a device adapted to be operably connected to the drive shaft of an automobile and utilize the power therefrom when the auto or motor car is in a stationary position, so that machinery may be driven therefrom.

A further object of this invention is the provision of a device of this character which may be quickly connected to and disconnected from the drive mechanism of a motor car engine, and in turn be controlled by a governor mechanism so that the accelerator or carbureter control of such engine may be regulated to maintain a constant speed of the driven shaft.

In the accompanying drawings:—

Figure 1 is a top plan view of a motor car chassis with the present device operably connected thereto.

Fig. 2 is a side elevation thereof.

Fig. 3 is an enlarged detail plan view of the present transmission mechanism *per se*.

Referring to the drawings, the numeral 5 designates the front end of the crank shaft of the engine 6 which is provided with the carbureter 7 and the throttle 8.

Adapted to be adjustably connected to the end of the shaft 5 is the loose sleeve 9 which is connected by means of the universal joint 10 to the driven shaft 11. This shaft 11 is journaled in the fixed bearings 12 and is adapted to be substantially alined with the crank shaft of the engine.

The motor car is so disposed when the shaft 11 is connected as to have the wheels thereof locked against movement so as to maintain the crank shaft of the engine operably connected to the shaft 11. This shaft 11 will be projected forwardly of the motor or engine, and where the engine is a self-starter, the shaft 11 is rotated in the usual manner.

Where, however, the engine is to be cranked, the connection 13 of the shaft 11 is adapted to be engaged by such crank and the engine rotated initially through the shaft 11. Pulleys or gearing 14 are disposed upon the shaft 11 so that power may be transmitted therefrom.

In order to provide a means for governing the speed of the engine and the consequent rotation of the shaft 11 and in consonance with the load, there is connected to the shaft 11 a beveled pinion 15 which is in mesh at all times with the pinion 16 upon the short shaft 17 journaled in bearings 18 and at right angles to the shaft 11.

The ball governor 19 is carried by the shaft 17 and its sliding sleeve 20 is operably connected to the rod 21 which in turn is extended rearwardly and attached to the throttle of the carbureter.

In this manner the speeding of the shaft 17 will tend to close the throttle, thus automatically regulating the speed of the driven shaft 11.

From the foregoing description it is evident that with a device of this character, the shaft 11 may be permanently mounted within a garage and be easily connected through the universal sleeve 9 to the forward end of the crank shaft, the rod 21 being detachably connected to the throttle of the carbureter, the usual throttle connection of the motor car being disconnected at this time.

What I claim as new is:—

In a device of the class described, in combination, a drive and a driven shaft, the driven shaft being mounted at right angles to the drive shaft, bearings for said respective shafts, a yoke formed upon one end of said drive shaft, a shaft extension universally connected in said head at one end and having a polygonal socket portion at its opposite end, a crank receiving socket member carried by said drive shaft at its opposite end, gears fixed upon both shafts and adapted to intermesh, a power transmitting device having a shaft, the socket portion of said extension shaft rotatably fitting the shaft of said power transmitting device being limited in movement thereagainst by the gear on said drive shaft when the latter engages the gear on the driven shaft, a throttle valve carried by said power transmitting device, a governor carried by said driven shaft and formed with a slidable lug, a crank arm secured to said valve, and a connecting rod pivotally connectible to said lug and connected to said last-named crank arm.

In testimony whereof I affix my signature.

WILLIAM L. WARD.